(12) United States Patent
Lee et al.

(10) Patent No.: US 9,294,761 B2
(45) Date of Patent: Mar. 22, 2016

(54) SHUTTER GLASSES AND DISPLAY APPARATUS INCLUDING THE SAME (75) Inventors: Sung-han Lee, Suwon-si (KR); Keun-seok Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 717 days.

(21) Appl. No.: 12/915,704

(22) Filed: Oct. 29, 2010

(65) Prior Publication Data

US 2011/0254931 A1 Oct. 20, 2011

(30) Foreign Application Priority Data

Apr. 16, 2010 (KR) ........................ 10-2010-0035169

(51) Int. Cl.
*G02B 27/22* (2006.01)
*H04N 13/04* (2006.01)

(52) U.S. Cl.
CPC ...... *H04N 13/0438* (2013.01); *H04N 2213/008* (2013.01)

(58) Field of Classification Search
None
See application file for complete search history.

(56) References Cited

U.S. PATENT DOCUMENTS

| | | | |
|---|---|---|---|
| 6,154,723 A | 11/2000 | Cox et al. | |
| 6,188,442 B1 * | 2/2001 | Narayanaswami | 348/564 |
| 6,228,021 B1 * | 5/2001 | Kania | 600/27 |
| 6,932,090 B1 * | 8/2005 | Reschke et al. | 128/898 |
| 8,717,254 B1 * | 5/2014 | Nave et al. | 345/8 |
| 2003/0012425 A1 * | 1/2003 | Suzuki et al. | 382/154 |
| 2003/0214630 A1 * | 11/2003 | Winterbotham | 351/203 |
| 2006/0061652 A1 | 3/2006 | Sato et al. | |
| 2008/0238723 A1 * | 10/2008 | Fein et al. | 340/988 |
| 2009/0295876 A1 * | 12/2009 | Kobayashi et al. | 347/71 |
| 2010/0079840 A1 * | 4/2010 | Murtonen | 359/238 |
| 2010/0271588 A1 * | 10/2010 | Kokonaski et al. | 351/158 |
| 2011/0228056 A1 * | 9/2011 | Okumoto | 348/51 |
| 2011/0234586 A1 * | 9/2011 | Aoki | 345/419 |

FOREIGN PATENT DOCUMENTS

| | | | |
|---|---|---|---|
| JP | 06078248 A | 3/1994 | |
| JP | 10-260377 A | 9/1998 | |
| JP | 11177907 A | 7/1999 | |

(Continued)

OTHER PUBLICATIONS

Extended European Search Report issued Apr. 1, 2011 in counterpart European Application No. 10191708.6.
Communication from the European Patent Office issued Jun. 21, 2012 in counterpart European Application No. 10191708.6.

(Continued)

*Primary Examiner* — Kate Luo
(74) *Attorney, Agent, or Firm* — Sughrue Mion, PLLC (57) ABSTRACT

Disclosed are shutter glasses, a display apparatus, and control method therefore, which enables a user to control the display apparatus while wearing the shutter glasses. The shutter glasses include a communication unit which communicates with a display apparatus; a shutter which comprises a left eye shutter and a right eye shutter that are alternately open and shut; a sensor which senses a predetermined movement of the shutter glasses; and a controller which controls the shutter to be open and shut selectively based on a sync signal received from the display apparatus through the communication unit and corresponding to the 3D image, and controls the communication unit to generate and transmit a control signal controlling the display apparatus corresponding to the predetermined movement of the shutter glasses sensed by the sensor.

23 Claims, 8 Drawing Sheets

(56) References Cited

FOREIGN PATENT DOCUMENTS

| | | |
|---|---|---|
| JP | 2000308092 A | 11/2000 |
| JP | 2001-222723 A | 8/2001 |
| JP | 2003-168136 A | 6/2003 |
| JP | 2004-021848 A | 1/2004 |
| JP | 2009-017541 A | 1/2009 |
| KR | 10-2010-0000734 A | 1/2010 |
| KR | 10-2010-0038645 A | 4/2010 |

OTHER PUBLICATIONS

Communication dated Dec. 22, 2014 issued by Korean Intellectual Property Office in counterpart Korean Application No. 10-2010-0035169.

Communication from the Korean Intellectual Property Office dated Jun. 29, 2015 in a counterpart Korean application No. 10-2010-0035169.

\* cited by examiner

SHUTTER GLASSES AND DISPLAY APPARATUS INCLUDING THE SAME

CROSS-REFERENCE TO RELATED APPLICATION

This application claims priority from Korean Patent Application No. 10-2010-0035169, filed on Apr. 16, 2010 in the Korean Intellectual Property Office, the disclosure of which is incorporated herein by reference.

BACKGROUND

1. Field

Apparatuses and methods consistent with the exemplary embodiments relate to shutter glasses and a display apparatus including the same. More particularly, the apparatuses and methods relate to shutter glasses and a display apparatus including the same, which enables a user to control the display apparatus while wearing the shutter glasses.

2. Description of the Related Art

A display apparatus may display a two-dimensional (2D) image or a three-dimensional (3D) image according to its characteristics. Each of a user's two eyes have a different view angle and accordingly may recognize an object in three dimensions. With such principle in mind, a 3D image is divided into left eye images and right eye images, which are alternately displayed on the display apparatus. The display apparatus includes shutter glasses which operate in a manner corresponding to the left eye images and the right eye images.

When a user wears shutter glasses, left eye images and right eye images are displayed, by frame, on the display apparatus, and shutter glasses selectively open or shut with regard to a user's two eyes as a left-eye image or a right-eye image is displayed in a frame unit. That is, when the display apparatus displays a left eye image, the shutter glasses open a left eye shutter. On the contrary, when the display apparatus displays a right eye image, the shutter glasses open a right eye shutter and allow a user to recognize the 3D effect of the image.

Therefore, a user may consider it inconvenient to manipulate a remote control to control the display apparatus while wearing the shutter glasses in order to view a 3D image displayed on the display apparatus.

Further, it is not easy for a user to recognize the proper distance and angle with respect to the display apparatus necessary to fully enjoy the 3D image of the display apparatus.

SUMMARY

Accordingly, one or more exemplary embodiments provide shutter glasses and a display apparatus including the same which enables a user to control the display apparatus while wearing the shutter glasses.

Another exemplary embodiment is to provide shutter glasses and a display apparatus including the same which indicates the proper location at which a user can best view a 3D image while wearing the shutter glasses.

An exemplary embodiment is to provide shutter glasses, which are provided for use with a display apparatus displaying a 3D image, the shutter glasses comprising: a communication unit which communicates with a display apparatus; a shutter which comprises a left eye shutter and a right eye shutter that are alternately open and shut; a sensor which senses a predetermined movement of the shutter glasses; and a controller which controls the shutter to be open and shut selectively based on a sync signal received from the display apparatus through the communication unit and corresponding to the 3D image, and controls the communication unit to generate and transmit a control signal controlling the display apparatus corresponding to the predetermined movement of the shutter glasses sensed by the sensor.

The sensor senses at least one of a moving direction, angle, acceleration, angular velocity, variation and distance from the display of the shutter glasses.

The controller determines whether a user is wearing the shutter glasses, based on the sensed movement of the shutter glasses, and turns the shutter glasses on and off corresponding to the determination result.

The controller generates and transmits a control signal corresponding to a playing of an image, suspension of playing an image, ending playing of an image, changing a chapter or a channel or adjusting volume based on the sensed movement of the shutter glasses, when the shutter glasses are turned on.

The sensor comprises at least one of an acceleration sensor, a gyro sensor, a compass sensor, a magnetic impedance (MI) sensor, a proximity sensor, and a pyroelectric passive infrared ray (PIR) sensor.

The sensor senses the location of the shutter glasses with respect to the display apparatus. The controller determines whether the sensed location of the shutter glasses is within a predetermined reference location and outputs information indicating that the location is not within the predetermined reference location when the location is not within the reference location.

The controller either generates and transmits a control signal to display a graphic user interface (GUI), or outputs an audio signal indicating that the location of the shutter glasses is not within the predetermined reference location.

The shutter glasses further comprise an audio output unit, wherein the controller controls the audio output unit to output an audio signal corresponding to information indicating that the location of the shutter glasses is not within the predetermined reference location.

Another exemplary embodiment is to provided a display apparatus which uses shutter glasses, the display apparatus comprising: a signal processor which processes a predetermined 3D image signal; a display unit which displays thereon a 3D image corresponding to the 3D image signal processed by the signal processor; a communication unit which communicates with the shutter glasses; and a controller which performs an operation corresponding to a control signal upon receiving, from the shutter glasses through the communication unit, the control signal corresponding to a predetermined movement of the shutter glasses.

The control signal comprises a control signal corresponding to a playing of a 3D image displayed on the display unit, suspension of playing an image, ending of playing an image, change of a chapter or a channel or adjustment of volume.

The display apparatus further comprises a user interface (UI) generator which generates UI information, wherein the controller controls the UI generator to generate and display a UI on the display unit corresponding to a control signal, upon receiving through the communication unit, the control signal of a UI indicating that the location of the shutter glasses is not within a predetermined reference location.

The display apparatus further comprises a speaker which outputs an audio signal corresponding to an audio signal, wherein the controller controls the speaker to output an audio signal corresponding to a control signal, upon receiving the control signal corresponding to the information indicating that the location of the shutter glasses is not within the predetermined reference location.

The display apparatus further comprises shutter glasses which comprises a communication unit which communicates with a display apparatus; a sensor which senses a predetermined movement of shutter glasses; and a controller which controls the communication unit to generate and transmit a control signal controlling the display apparatus, corresponding to predetermined movement of the shutter glasses sensed by the sensor.

The sensor of the shutter glasses senses at least one of a moving direction, angle, acceleration, angular velocity, variation and distance of the shutter glasses.

The controller of the shutter glasses determines whether a user is wearing the shutter glasses based on the sensed movement of the shutter glasses and turns on and off the shutter glasses corresponding to the determination result.

The controller of the shutter glasses generates and transmits a control signal corresponding to a playing of an image displayed on the display apparatus, suspension of playing an image, ending playing of an image, change of a chapter or a channel or adjustment of volume based on the sensed movement of the shutter glasses, when the shutter glasses are turned on.

The sensor of the shutter glasses comprises at least one of an acceleration sensor, a gyro sensor, a compass sensor, a magnetic impedance (MI) sensor, a proximity sensor and a pyroelectric passive infrared ray (PIR) sensor.

The sensor of the shutter glasses senses a location of the shutter glasses with respect to the display apparatus, and the controller of the shutter glasses determines whether the sensed location of the shutter glasses is within a predetermined reference location and generates and transmits a control signal to output, from the display apparatus, information indicating that the location is not within the predetermined reference location, when it is determined that the location is not within the predetermined reference location.

Still another exemplary embodiment is to provide a control method of shutter glasses which are provided in a display apparatus displaying a 3D image, the control method comprising: sensing a predetermined movement of shutter glasses; and generating and transmitting a control signal controlling the display apparatus corresponding to the sensed predetermined movement of the shutter glasses.

The control method further comprises determining whether a user is wearing shutter glasses based on sensed movement of the shutter glasses; and turning on and off the shutter glasses corresponding to the determination result.

The transmitting the control signal comprises generating and transmitting a control signal corresponding to a playing of an image displayed on the display apparatus, suspension of playing an image, ending of playing an image, change of a chapter or a channel or adjustment of volume based on the sensed movement of the shutter glasses, when the shutter glasses are turned on.

The sensing of the predetermined movement further comprises sensing a location of the shutter glasses with respect to the display apparatus; and determining whether the sensed location of the shutter glasses is within a predetermined reference location, and the transmitting of the control signal comprises generating and transmitting a control signal to output from the display apparatus information indicating that the location is not within the predetermined reference scope, when it is determined that the location is not within the predetermined reference location.

Still another exemplary embodiment is to provide a control method of a display apparatus which uses shutter glasses, the control method comprising: receiving a control signal from shutter glasses corresponding to a predetermined movement of the shutter glasses; and performing an operation corresponding to receipt of the control signal.

The control signal comprises a control signal corresponding to a playing of a 3D image displayed on the display unit, suspension of playing an image, ending of playing an image, change of a chapter or a channel or adjustment of volume.

The receiving the control signal further comprises receiving information indicating that the location information of the shutter glasses received through the communication unit is not within a predetermined reference location, and generating and displaying a user interface (UI) corresponding to the received information.

The receiving the control signal further comprises receiving information indicating that the location of the shutter glasses, received through the communication unit, is not within a predetermined reference location, and outputting an audio signal corresponding to the received information.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
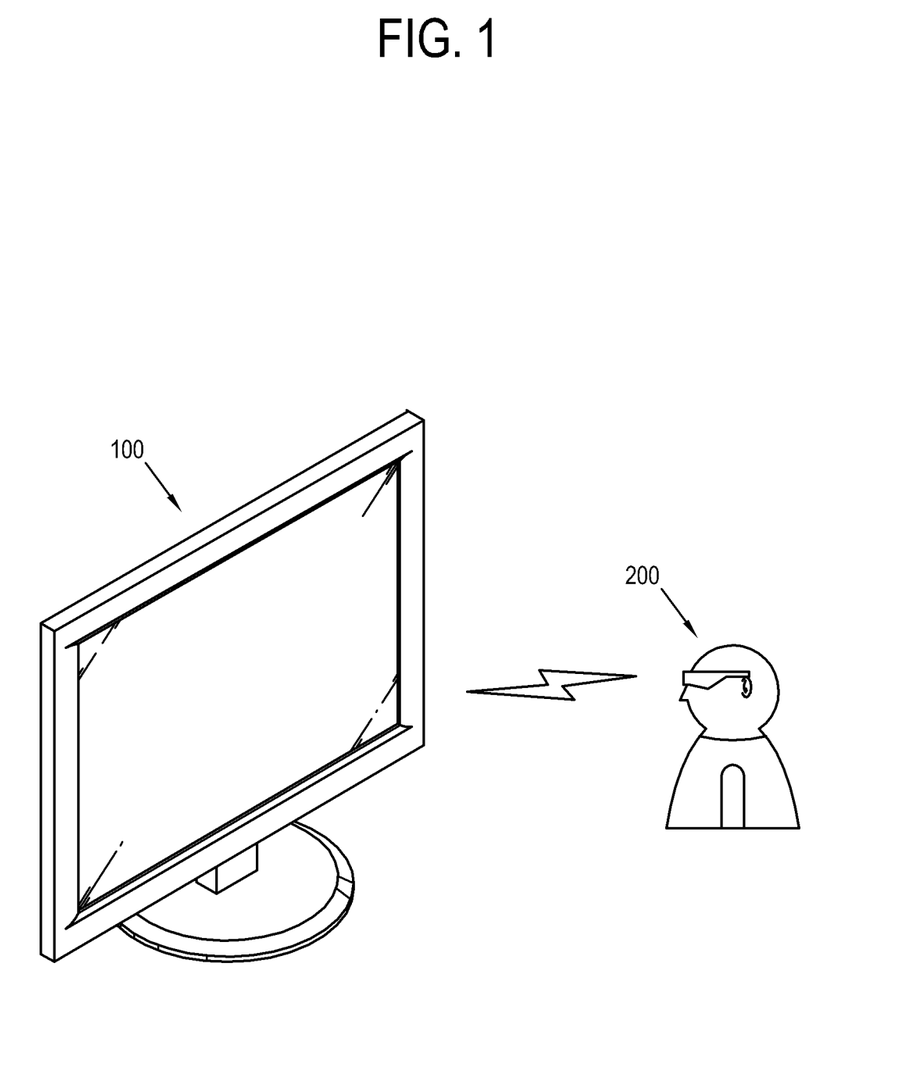
FIG. 1 is a schematic view of a display system which includes a display apparatus and shutter glasses according to an exemplary embodiment.

FIG. 1 is a schematic view of a display system which includes a display apparatus 100 and shutter glasses 200 according to an exemplary embodiment.

As shown therein, the display system includes the display apparatus 100 which processes an image signal output from the outside and displays an image thereon, and shutter glasses 200 which operate corresponding to a 3D image displayed on display apparatus 100.

Display apparatus 100 receives an image signal from an external image supply source (not shown), which is not limited. Display apparatus 100 may receive an image signal from various image supply sources such as a computer main body (not shown) generating an image signal with a central processing unit (CPU) (not shown) and a graphic card (not shown) and providing the generated image by a local connection, a server (not shown) providing an image signal in a network, or a broadcasting transmitter (not shown) transmitting a broadcasting signal through air waves or through a cable, etc.

Upon receiving a 2D image signal or a 3D image signal from the outside, the display apparatus 100 processes the image signal and displays thereon a 2D image or a 3D image. Unlike the 2D image, the 3D image is divided into a left eye image corresponding to a user's left eye, and a right eye image corresponding to a user's right eye. Upon receiving the 3D image signal, display apparatus 100 alternately displays the left eye image and the right eye image frame by frame, based on the received image signal. Display apparatus 100 transmits a sync signal to shutter glasses 200 to alternately open and shut a left eye shutter and a right eye shutter of shutter glasses 200 corresponding to the frames of the left eye image and the right eye image.

When the display apparatus 100 displays a 3D image, shutter glasses 200 selectively open or close the left eye shutter or the right eye shutter corresponding to one of the left eye image and the right eye image which is being displayed. That is, when display apparatus 100 displays a left eye image, shutter glasses 200 open the left eye shutter and close the right eye shutter. On the contrary, if display apparatus 100 displays a right eye image, shutter glasses 200 open the right eye shutter and close the left eye shutter.

According to the exemplary embodiments, a user should wear shutter glasses 200 to fully enjoy a 3D image displayed on the display apparatus 100. Accordingly, the exemplary embodiments provide shutter glasses and a display apparatus including the same, which enables a user to control the display apparatus, without a remote controller, while wearing the shutter glasses.

Figure 2:
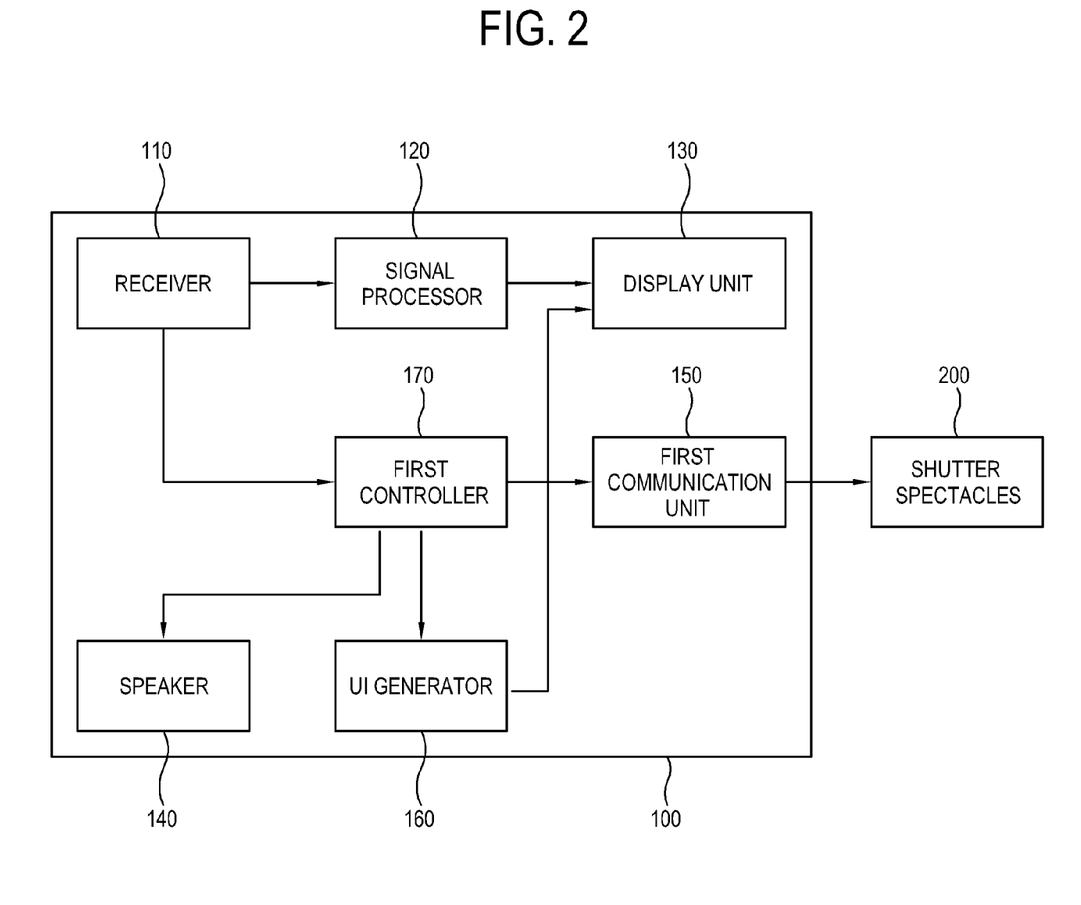
FIG. 2 is a control block diagram of the display apparatus according to the exemplary embodiment.

FIG. 2 is a control block diagram of display apparatus 100 according to an exemplary embodiment.

As shown therein, display apparatus 100 according to the present exemplary embodiment includes a receiver 110, a signal processor 120, a display unit 130, a speaker 140, a first communication unit 150, a user interface (UI) generator 160, and a first controller 170 controlling the foregoing elements.

Receiver 110 receives an image signal from the outside and transmits the image signal to signal processor 120. Receiver 110 may vary depending on the standards of the received image signal and embodiment of the display apparatus 100. The image signal may include a 2D image signal or a 3D image signal and may further include an audio signal or a data signal.

For example, when display apparatus 100 is a TV, receiver 110 may receive a radio frequency (RF) signal transmitted by a broadcasting transmitter in a wireless manner, or may receive an image signal in compliance with composite video, component video, super video, Syndicat des Constructeurs des Appareils Radiorécepteurs et Téléviseurs (SCART), or high definition multimedia interface (HDMI) standards. Receiver 110 may further include an antenna (not shown) and/or a tuner (not shown) tuning a broadcasting channel.

For example, when display apparatus 100 is a PC monitor, receiver 110 may include D-sub to transmit an RGB signal according to VGA, DVI-A according to digital video interactive (DVI), integrated digital/analog (DVI-I), DVI-D or HDMI standards. Receiver 110 may include a display port, a unified display interface (UDI) or a wireless HD.

Signal processor 120 processes the image signal received through receiver 110, and displays on display unit 130 an image corresponding to the processed image signal.

Signal processor 120 processes an image signal by various preset methods. The processing of signal processor 120 may include decoding and encoding of an image in various formats, de-interlacing, converting of a frame refresh rate, scaling, noise reduction for enhancement of image quality, detail enhancement, line scanning, etc. Signal processor 120 may perform the foregoing processing operations individually or collectively.

Signal processor 120 processes an image signal into a plurality of horizontal scanning lines and scans the image signal to display unit 130. Signal processor 120 scans the image from an upper side to a lower side of display unit 130. When scanning of a single frame is completed, the signal processor 120 scans an image of the next frame after a preset non-scanning time elapses. Signal processor 120 alternately scans the image signal corresponding to the left eye image and the right eye image to display unit 130 upon receiving the image signal corresponding to a 3D image from receiver 110. Accordingly, display unit 130 alternately displays thereon the left eye image and the right eye image during the non-scanning time.

Signal processor 120 may process an audio signal received through receiver 110 together with the image signal. Signal processor 120 processes the audio signal by various preset methods, which are not limited. For example, signal processor 120 may convert an analog audio signal to a digital audio signal, amplify the audio signal, adjust an output level or adjust a frequency of the audio signal. The processing of the audio signal by signal processor 120 may be performed individually or collectively. Further, signal processor 120 may generate a predetermined audio signal.

Display unit 130 displays thereon an image corresponding to an image signal processed by signal processor 120. Here, the plurality of horizontal scan lines scanned by video signal processor 120 are vertically arranged, so that one video frame can be displayed in display unit 130. Display unit 130 may include a display panel (not shown) to display the image thereon. The display panel may include a liquid crystal display (LCD) panel including a liquid crystal layer, an organic light emitting diode (OLED) including an organic light emitting layer or a plasma display panel (PDP).

Display apparatus 100 may further include a sync signal generator (not shown) which generates a sync signal to open and shut a shutter 220 of shutter glasses 200 corresponding to an image signal displayed on display unit 130.

Speaker 140 outputs an audio corresponding to an audio signal processed by signal processor 120. Speaker 140 may include a woofer speaker.

First communication unit 150 communicates with shutter glasses 200. Display apparatus 100 may transmit and receive a sync signal and a control signal to/from shutter glasses 200 through first communication unit 150. The sync signal and the control signal may be transmitted and received by various communication standards such as IR, RF or Zigbee. First communication unit 150 may include various communication modules corresponding to the communication methods as above.

UI generator 160 generates UI information by control of the controller 170 and displays UI information on display unit 130. The operation of UI generator 160 will be described later, in detail.

Upon receiving a control signal corresponding to a predetermined movement of shutter glasses 200, from shutter glasses 200 through first communication unit 150, first controller 170 performs an operation corresponding to the control signal. Operation of first controller 170 will be described later in detail.

Figure 3:
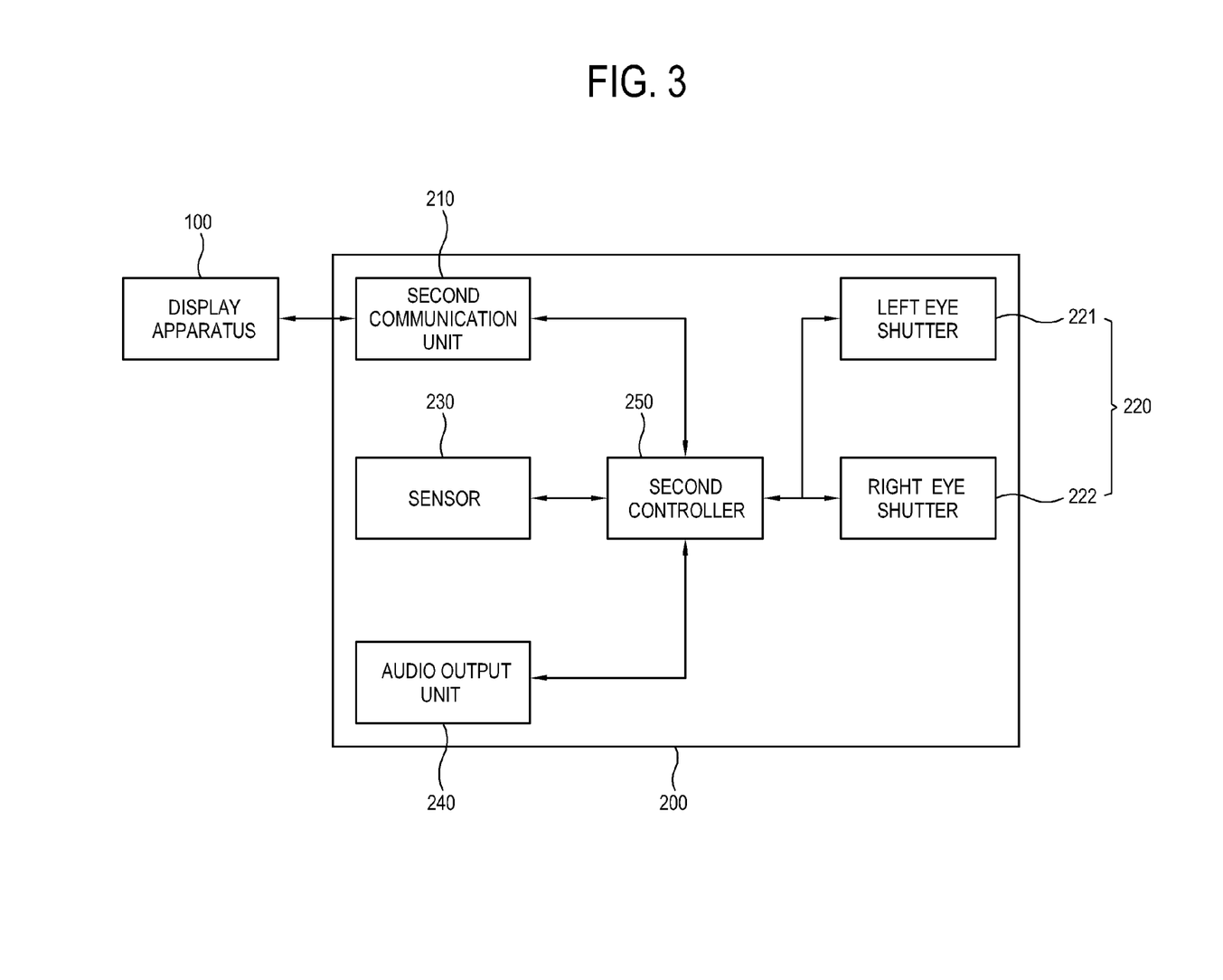
FIG. 3 is a control block diagram of the shutter glasses according to the exemplary embodiment.

FIG. 3 is a control block diagram of shutter glasses 200 according to an exemplary embodiment.

As shown therein, shutter glasses 200 include a second communication unit 210, a shutter unit 220, a sensor 230, an audio output unit 240 and a second controller 250 controlling the foregoing elements.

Second communication unit 210 communicates with display apparatus 100. Second communication unit 210 corresponds to the standard of first communication unit 150 of display apparatus 100. Shutter glasses 200 transmit and receive a sync signal and a control signal to/from display apparatus 100 through second communication unit 210.

Shutter 220 includes a left eye shutter 221 and a right eye shutter 222 corresponding to a user's eyes. Left eye shutter 221 and right eye shutter 222 selectively allow light to penetrate them by control of controller 250, and more specifically, by a voltage applied by controller 250. To support the foregoing function, a current flows between left and right eye shutters 221 and 222 and controller 250.

Sensor 230 senses a predetermined movement of shutter glasses 200. Sensor 230 senses at least one of a moving direction, angle, acceleration, angular acceleration, variation and distance of shutter glasses 200. Sensor 230 may include at least one of an acceleration sensor, gyro sensor, compass sensor, magnetic impedance (MI) sensor, proximity sensor and pyroelectric passive infrared ray (PIR) sensor. Sensor 230 may include various types of sensors mounted therein, either individually or collectively.

The acceleration sensor may measure the dynamic power such as acceleration, vibration and shock of an object. The gyro sensor or gyroscope may measure a moving direction or angular velocity of a moving object. The compass sensor may measure the magnetic north or the earths magnetic field. The MI sensor is a combined sensor of a compass sensor and an acceleration sensor. The combined sensor can measure impedance changes by the magnetic field or mechanical power. The MI sensor may sense a magnetic field or mechanical power by using the foregoing features. The proximity sensor may measure a target object by a non-contact method and detect an access within a distance of several centimeters. The PIR sensor may sense a heat emission having a wavelength in a scale of several microns and sense even a very small change in ambient temperature or a very small change in the temperature pattern of a space.

Sensor 230 may be provided in various locations in shutter glasses 200. The various locations of sensor 230 will be described later with reference to FIG. 4.

The sensing operation of sensor 230 will be described later in detail.

Audio output unit 240 outputs a predetermined audio signal. Shutter glasses 200 may further include an audio generator (not shown) which generates a predetermined audio signal. The predetermined audio signal which is generated by the audio generator is output through audio output unit 240 by a control of second controller 250.

Second controller 250 alternately opens and shuts left eye shutter 221 and the right eye shutter 222 based on a sync signal received from the display apparatus 100 through second communication unit 210. Accordingly, when an image displayed on display unit 130 is a left eye image, the second controller 250 opens left eye shutter 221 and shuts right eye shutter 222. When an image displayed on display unit 130 is a right eye image, second controller 250 shuts left eye shutter 221 and opens right eye shutter 222. Then, a user may recognize the left eye image with his/her left eye and recognize the right eye image with his/her right eye.

Figure 4:
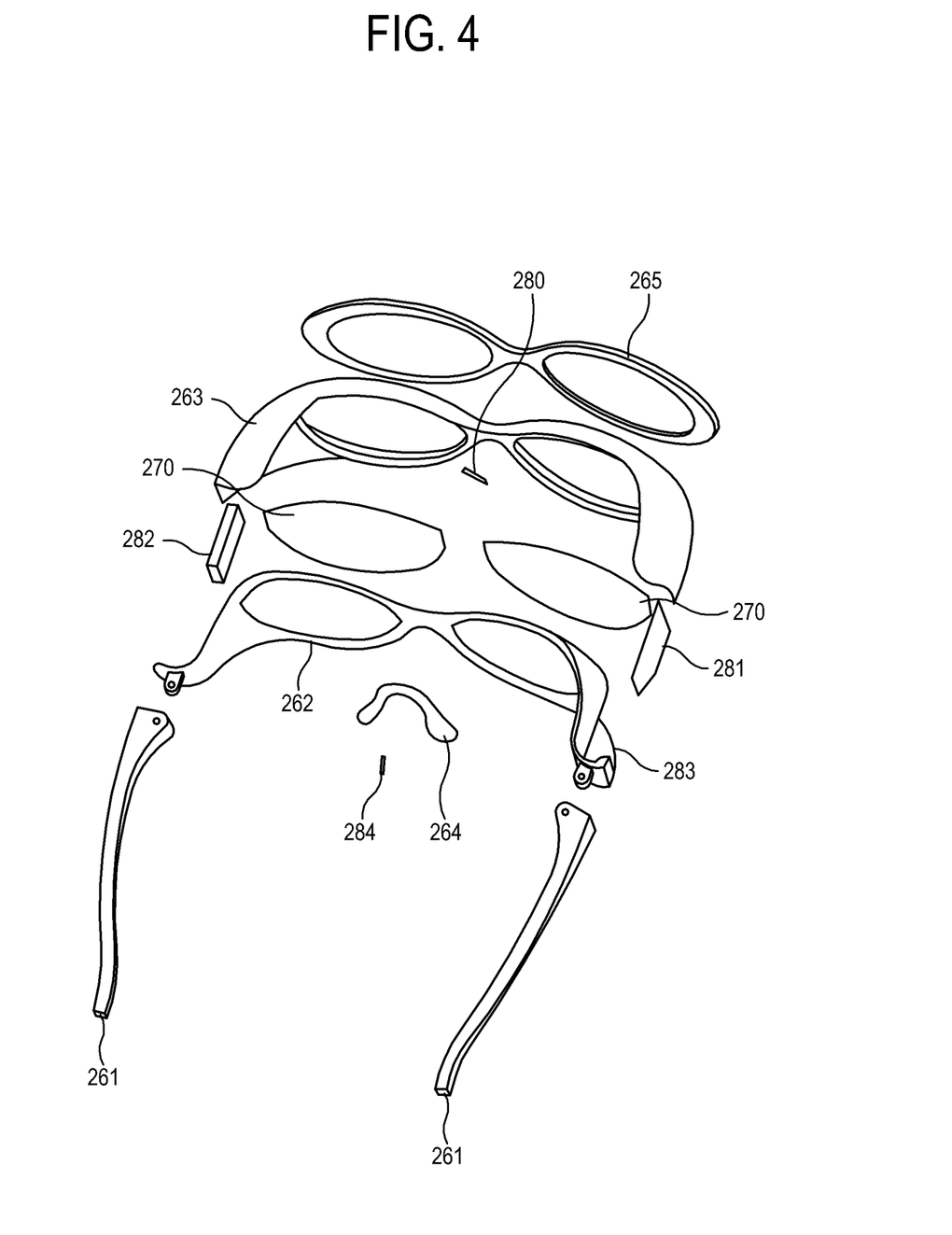
FIG. 4 illustrates an example of various locations of a sensor of the shutter glasses according to the exemplary embodiment.

FIG. 4 illustrates an example of various locations of sensor 230 of shutter glasses 200 according to the exemplary embodiments.

As shown therein, shutter glasses 200 largely include a shutter glasses frame 260, and a lens 270 which is supported by the shutter glasses frame 260 and includes a shutter blocking light or allowing light to penetrate it. Shutter glasses frame 260 includes temples 261, a rear case 262, a front case 263, a nose rubber 264 and a lens case 265. Accordingly, sensor 230 may be provided in any location of shutter glasses frame 260.

For example, sensor 230 may be provided in various locations of shutter glasses frame 260 including in a location 280 between rear case 262 and front case 263 of shutter glasses frame 260; in connections 281 and 282 between temples 261 and cases 262 and 263; in an internal part 283 of a dowel of temples 261; and in a location 284 in nose rubber 264. For example, a proximity sensor or a PIR sensor may be provided in internal part 283 of the dowel of temples 261 and location 284 of the nose rubber 264. An MI sensor may be provided in location 280 between rear case 262 and front case 263. The acceleration sensor, gyroscope or compass sensor may be provided in the other locations. Sensor 230 may be provided in a proper location of the frame of shutter glasses 200 corresponding to the special nature of sensor 230 according to the type of the sensor used.

Hereinafter, shutter glasses and a display apparatus including the same according to the exemplary embodiment will be described in more detail.

According to a first exemplary embodiment, second controller 250 determines whether a user wears shutter glasses 200 based on the movement of shutter glasses 200 sensed by the sensor 230, and turns on and off shutter glasses 200 corresponding to the determination result.

When shutter glasses 200 are turned off, sensor 230 maintains a standby mode. When a user picks up the glasses 200, sensor 230 senses the movement of shutter glasses 200. Sensor 230 senses the moving direction, moving distance, acceleration and angular velocity of shutter glasses 200. More preferably, sensor 230 may include an acceleration sensor, a gyro sensor, a compass sensor or an MI sensor. Sensor 230 transmits the sensing result to second controller 250. Upon receiving the sensing result from sensor 230 while shutter glasses 200 are turned off, second controller 250 determines that a user is wearing shutter glasses 200 and turns on shutter glasses 200. When sensor 230 continues to sense a user's face for a predetermined time while shutter glasses 200 are turned on, sensor 230 transmits the sensing result to second controller 250. Upon receiving the sensing result, second controller 250 transmits a control signal to display apparatus 100 to play a 3D image on display unit 130. Display apparatus 100 then displays a 3D image corresponding to the control signal. Sensor 230 may include the proximity sensor or PIR sensor and can sense a user's face.

If sensor 230, according to the present exemplary embodiment, includes a plurality of sensors, one of the sensors may wake up another sensor upon starting its operation. Accordingly, as soon as a user picks up shutter glasses 200, at least one of the acceleration sensor, the gyro sensor, the compass sensor and the MI sensor starts operating and wakes up and activates the proximity sensor or the PIR sensor sensing whether a user continues to wear shutter glasses 200.

When shutter glasses 200 become far away from a user's face or the sensing information expires while shutter glasses 200 are turned on and sensor 230 senses a user's face, sensor 230 transmits such information to second controller 250. Then, second controller 250 determines that a user has taken off the shutter glasses 200, and transmits a control signal to display apparatus 100 to stop playing the image and turns off shutter glasses 200. Display apparatus 100 stops playing the 3D image corresponding to the control signal.

Otherwise, upon determining that a user has taken off shutter glasses 200, second controller 250 may transmit the control signal to display apparatus 100 to stop playing the image, and turn off shutter glasses 200 when the second controller does not receive the result of sensing movement of the shutter glasses 200 or a user's face from sensor 230 for a predetermined time after receiving the determination that the user has taken off the shutter glasses.

Thus, the second controller 250 automatically turns off shutter glasses 200 and prevents a waste of power by shutter glasses 200.

Shutter glasses and a display apparatus including the same according to a second exemplary embodiment will be described with reference to FIG. 5. According to the second exemplary embodiment, while shutter glasses 200 are turned off, second controller 250 transmits, based on a movement of the shutter glasses 200 sensed by sensor 230, a control signal to display apparatus 100 to control the operation of display apparatus 100. Display apparatus 100 performs an operation corresponding to the control signal.

Figure 5:
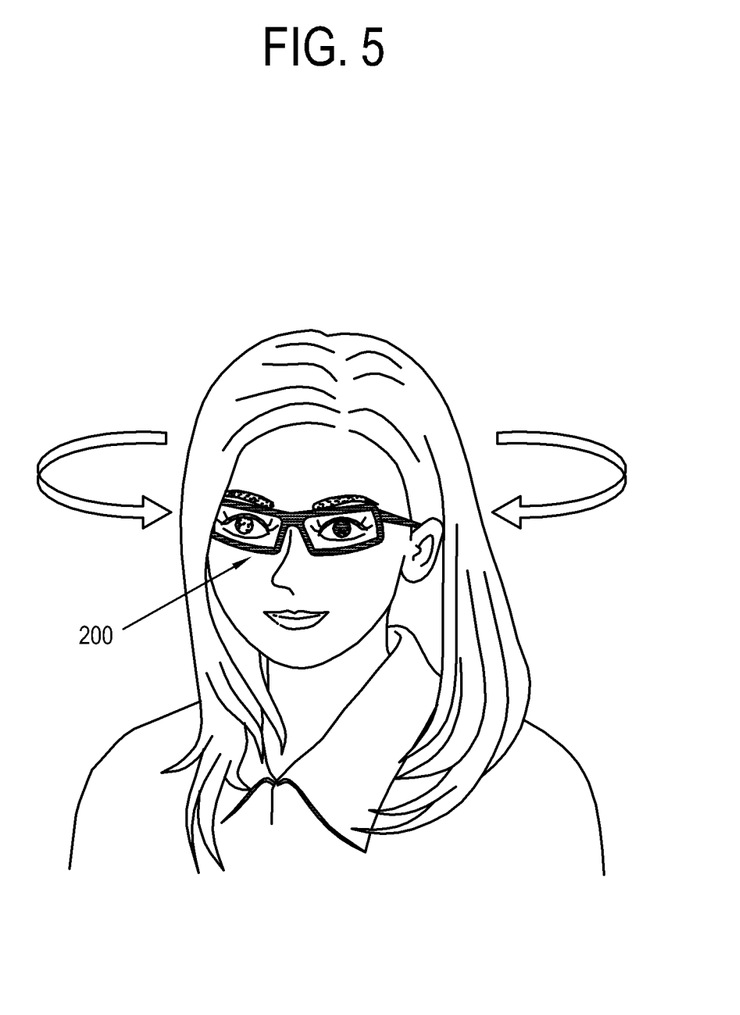
FIG. 5 illustrates an example of a user moving his/her head while wearing the shutter glasses.

FIG. 5 illustrates an example of a user moving his/her head while wearing shutter glasses 200. As shown therein, when a user wearing shutter glasses 200 moves his/her head right and left, sensor 230 senses the direction of movement, variation, acceleration and angular velocity of shutter glasses 200. According to the second exemplary embodiment, a user may control display apparatus 100 by simply shaking his/her head while shutter glasses 200 are turned on by a user wearing shutter glasses 200.

2-1. When a user moves his/her head right and left while wearing shutter glasses 200 and sensor 230 senses such movement, second controller 250 determines that a user is moving his/her head to adjust the volume of display apparatus 100, and transmits a control signal to display apparatus 100 to adjust the volume. First controller 170 of display apparatus 100 generates a UI for volume adjustment and displays the UI corresponding to the control signal on display unit 130. A user may move his/her head right and left again to further adjust the volume as desired. Second controller 250 may generate a buzzer sound or an audio signal and may output such sound or signal to audio output unit 240 to provide feedback to the user.

2-2. When a user moves his/her head to the left while wearing shutter glasses 200 and sensor 230 senses such movement, second controller 250 determines that a user moves his/her head to start playing the image all over again and transmits a control signal to the display apparatus 100 to restart the playing of the image. First controller 170 of display apparatus 100 plays the current image all over again corresponding to the control signal.

To inform a user of the control signal received from shutter glasses 200, first controller 170 may control UI generator 160 to generate a UI informing the start-over of the image and display such UI on the display unit 130. Otherwise, first controller 170 may generate an audio signal informing the user that the image is being replayed from the beginning and output the audio signal through speaker 140. Further, second controller 250 may generate a buzzer sound or an audio signal and output such sound or signal through audio output unit 240 to provide feedback to the user.

2-3. When a user moves his/her head right and left quickly while wearing the shutter glasses 200 and sensor 230 senses such movement, second controller 250 determines that a user is quickly moving his/her head to change a chapter of an image currently played on display apparatus 100 and transmits a control signal to display apparatus 100 to change the chapter. First controller 170 of the display apparatus 100 generates a UI and displays the UI on display unit 130 to change the chapter corresponding to the control signal. A user may quickly move his/her head right and left again and search and play a desired chapter. Second controller 250 of shutter glasses 200 may generate a buzzer sound or an audio signal and output such sound or signal through audio output unit 240 to provide feedback to the user.

2-4. When a user moves his/her head up and down while wearing shutter glasses 200 and sensor 230 senses such movement, second controller 250 determines that the user is moving his/her head to change the channel currently displayed on display apparatus 100, and transmits a control signal to display apparatus 100 to change the channel. First controller 170 of display apparatus 100 generates a UI and displays the UI on display unit 130 to change the channel corresponding to the control signal. A user may move his/her head up and down again to further search for and play a desired channel. Second controller 250 of shutter glasses 200 may generate a buzzer sound or an audio signal and output such sound or signal through audio output unit 240 to provide feedback to the user.

The second exemplary embodiment as described above is an optimum exemplary embodiment; but the present invention is not limited thereto.

When a user wears shutter glasses 200, control signals may be set for playing images, suspending playing images, ending playing of an image, changing the chapter or channel or adjusting volume. The moving direction, the quantity and speed of the movement of a user's head while a user wears the shutter glasses 200 may be set to a desired level and a desired control signal may be set. Then, shutter glasses 200 according to the present exemplary embodiment may provide a tailored service for a user.

Figure 6:
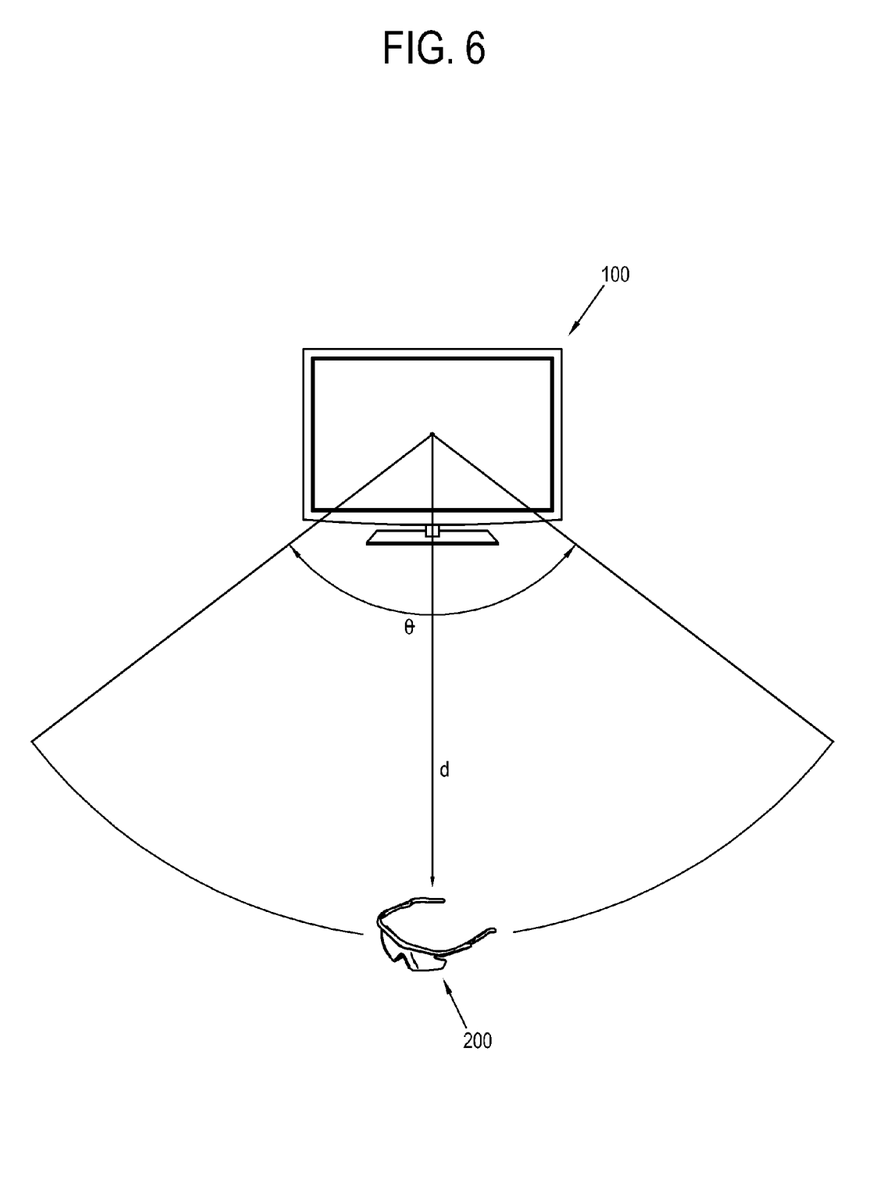
FIG. 6 illustrates a distance and an angle of the shutter glasses with respect to the display apparatus.

Shutter glasses 200 and a display apparatus including the same according to a third exemplary embodiment of the present invention will be described with reference to FIG. 6. FIG. 6 illustrates distance d and angle $\theta$ of the shutter glasses 200 with respect to display apparatus 100.

According to the third exemplary embodiment, while shutter glasses 200 are turned on, sensor 230 senses a location of shutter glasses 200 based on display apparatus 100. Second controller 250 determines whether the location of shutter glasses 200 with respect to display apparatus 100 is appropriate for viewing a 3D image based on the sensed location of shutter glasses 200.

A user should maintain a proper distance and angle from display apparatus 100 to fully enjoy a 3D image while wearing the shutter glasses 200. When a user is not in an optimum position, the image may be distorted or a user may view an image which he/she does not recognize. This results from a user's visual capability, miscalculation of visible data or a user's failure to recognize the image. Thus, there is a necessity for informing a user of an optimum location when a user is not in the optimum position to view a 3D image.

As shown in FIG. 6 and according to the third exemplary embodiment, sensor 230 senses a location of shutter glasses 200 with respect to the display apparatus 100. That is, sensor 230 may sense a distance d of shutter glasses 200 from the display apparatus 100, as well as the direction or angle $\theta$ of shutter glasses 200 from display apparatus 100. The sensing result is transmitted to second controller 250, which determines whether the location information regarding sensed shutter glasses 200 is within a predetermined reference location.

When it is determined that the location information is not within the predetermined reference location, second controller 250 generates a control signal and transmits the control signal to display apparatus 100 to output information indicating that the location is outside of the reference location.

First controller 170 of display apparatus 100, which receives the control signal, may control UI generator 160 to generate a UI displaying the information that a location of a user wearing shutter glasses 200 is out of the predetermined reference location and display the UI on display unit 130. This enables a user to move to an optimum location for better viewing of the 3D image. Otherwise, first controller 170 may generate an audio signal informing that the location of a user wearing shutter glasses 200 is out of the predetermined reference location and output the audio signal through speaker 140.

When it is determined that the sensed location information of shutter glasses 200 is out of the predetermined reference location, second controller 250 may generate a buzzer sound or an audio signal warning the user wearing the shutter glasses that he/she is outside the predetermined reference location and output the sound or signal through audio output unit 240. For example, second controller 250 may generate a different buzzer sound or audio signal when a user's location is within or outside of the predetermined reference location and output such sound or signal through the audio output unit to thereby assist a user in moving to a location within the predetermined reference location.

When the movement of shutter glasses 200 according to the first, second and third exemplary embodiments of the present invention is sensed and the control signal is generated and transmitted to display apparatus 100, display apparatus 100, which receives the control signal, generates and displays a UI summarizing the control signal. Accordingly, a user is informed of the operation of the display apparatus 100 corresponding to the control signal and the user's use of the shutter glasses is improved.

Figure 7:
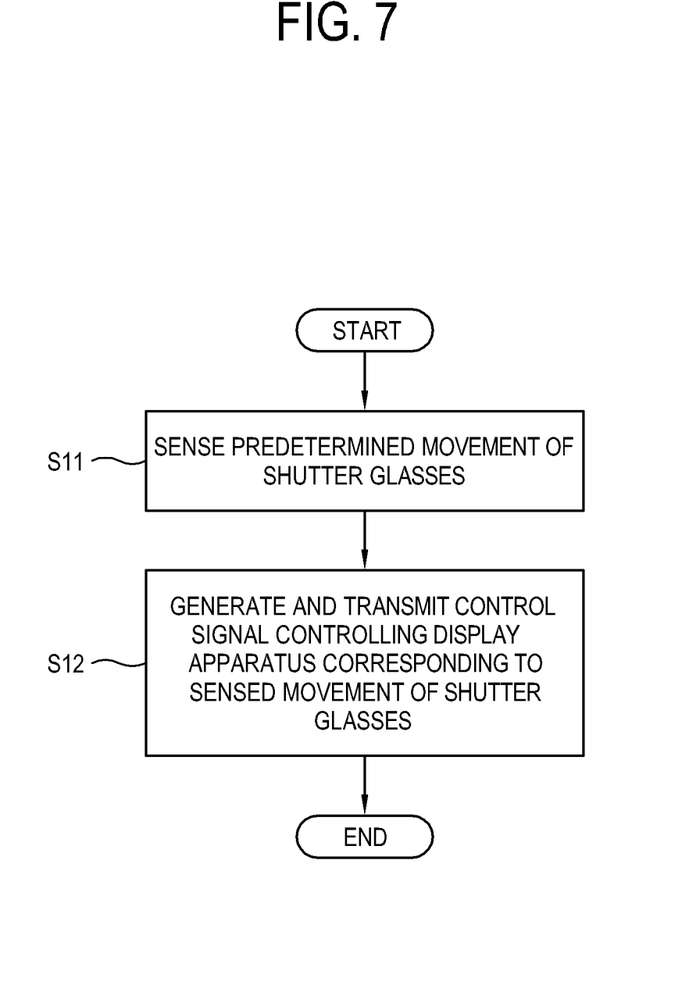
FIG. 7 is a flowchart of a control method of the shutter glasses according to the exemplary embodiment.
Figure 8:
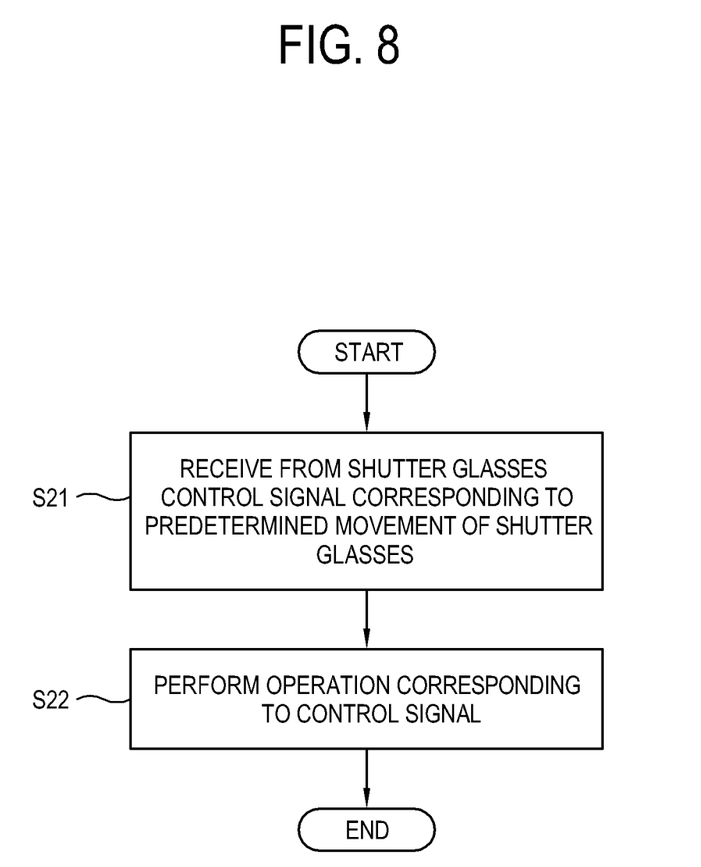
FIG. 8 is a flowchart of a control method of the display apparatus according to the exemplary embodiment.

FIG. 7 is a flowchart of a control method of shutter glasses 200 according to an exemplary embodiment. FIG. 8 is a flowchart of a control method of display apparatus 100 according to an exemplary embodiment.

As shown in FIG. 7, sensor 230 of shutter glasses 200 senses the predetermined movement of shutter glasses 200 (S11), and transmits the sensing result to second controller 250. Second controller 250 generates and transmits a control signal to control display apparatus 100 corresponding to the sensed movement of shutter glasses 200 (S12).

The control method further includes determining whether a user is wearing shutter glasses 200 based on a sensed movement of shutter glasses 200; and turning on and off shutter glasses 200 corresponding to the determination result.

The transmitting of the control signal includes generating and transmitting control signals corresponding to playing of an image, suspending playing of an image, ending playing of an image, changing a chapter and a channel or adjusting volume based on the sensed movement of shutter glasses 200, when shutter glasses 200 are turned on.

The sensing includes sensing the location of shutter glasses 200 with respect to display apparatus 100 and further includes determining whether the sensed location of shutter glasses 200 is included in the predetermined reference location. The transmitting of the control signal includes generating and transmitting the control signal to output information indicating that the location is not within the predetermined reference location.

The sensing of the predetermined movement includes sensing the location of shutter glasses 200 with respect to display apparatus 100. The transmitting of the control signal includes generating and transmitting a control signal to output the information indicating the sensed location of shutter glasses 200 from display apparatus 100.

As shown in FIG. 8, the control method of display apparatus 100 includes display apparatus 100 receiving a control signal from shutter glasses 200; the control signal corresponding to the predetermined movement of shutter glasses 200 (S21), and performing an operation corresponding to control signal (S22).

The control signal includes a control signal corresponding to playing a 3D image displayed on display unit 130, suspension of playing the image, ending of playing, changing a chapter or channel or adjustment of volume.

The receiving of the control signal includes receiving information from the communication unit that the location information received from shutter glasses 200 indicates that the shutter glasses are not within in the predetermined reference location. The receiving of the control signal further includes generating and displaying a UI corresponding to the received information.

The receiving of the control signal includes receiving information from the communication unit indicating that the location information of shutter glasses 200 is not included in the predetermined reference location, and further includes outputting an audio signal corresponding to the received information.

As described above, shutter glasses and a display apparatus including the same according to the exemplary embodiments enables a user wearing the shutter glasses to control the display apparatus with a movement of the shutter glasses, instead of using a remote controller, for the convenience of the user. Further, the shutter glasses, and the display apparatus including the same, informs a user of an optimum location to enjoy a 3D image, for the user's convenience.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. Shutter glasses being used for a display apparatus displaying a 3D image, the shutter glasses comprising:
   a communication unit for communication with the display apparatus;
   a pair of shutters which comprise a left eye shutter and a right eye shutter that are alternately open and shut;
   a sensor which senses a movement of the shutter glasses; and
   a controller which controls the pair of shutters to open and shut selectively based on a sync signal which corresponds to the 3D image which is received from the display apparatus through the communication unit,
   wherein said controller controls the communication unit to generate and transmit a control signal corresponding to the movement of the shutter glasses, the control signal directing the display apparatus to perform an operation which adjusts audio data or video data output by the display apparatus corresponding to the control signal, and
   wherein the controller generates and transmits the control signal corresponding to at least one of playing images, suspending playing images, ending playing of an image, channel change and volume adjustment based on the sensed movement of the shutter glasses.

2. The shutter glasses according to claim 1, wherein the sensor senses at least one of a moving direction, angle, acceleration, angular velocity, variation and distance of the shutter glasses.

3. The shutter glasses according to claim 1, wherein when the shutter glasses are turned on, the controller generates and transmits a control signal corresponding to a playing of an image, suspension of playing an image, ending playing of an image, changing a chapter or a channel or adjusting volume based on the sensed movement of the shutter glasses.

4. The shutter glasses according to claim 1, wherein the sensor comprises at least one of an acceleration sensor, a gyro sensor, a compass sensor, a magnetic impedance (MI) sensor, a proximity sensor, and a pyroelectric passive infrared ray (PIR) sensor.

5. The shutter glasses according to claim 1, wherein the sensor senses a location of the shutter glasses with respect to the display apparatus, and
the controller determines whether the sensed location of the shutter glasses is within a predetermined reference location from the display apparatus, and
when the location of the shutter glasses is not within the predetermined reference location, the controller outputs information indicating that the location of the shutter glasses is not within the predetermined reference location.

6. The shutter glasses according to claim 5, wherein the controller generates and transmits a control signal to display a graphic user interface (GUI) or output an audio indicating that the location of the shutter glasses is not within the predetermined reference location.

7. The shutter glasses according to claim 5, further comprising an audio output unit, wherein the controller controls the audio output unit to output an audio corresponding to the information indicating that the location of the shutter glasses is not within the predetermined reference location.

8. A display apparatus which uses shutter glasses, the display apparatus comprising:
a signal processor which processes a 3D image signal;
a display unit which displays thereon a 3D image corresponding to the 3D image signal processed by the signal processor;
a communication unit which communicates with the shutter glasses; and
a controller which performs an operation corresponding to a control signal upon receiving from the shutter glasses, through the communication unit,
wherein the control signal comprises a control signal corresponding to a movement of the shutter glasses, the control signal directing the display apparatus to perform an operation which adjusts audio data or video data output by the display apparatus corresponding to the control signal,
wherein the shutter glasses comprise:
a communication unit which communicates with the display apparatus;
a sensor which senses a predetermined movement of shutter glasses; and
a controller which controls the communication unit to generate and transmit a control signal controlling the display apparatus, corresponding to predetermined movement of the shutter glasses sensed by the sensor, and
wherein the controller of the shutter glasses generates and transmits the control signal corresponding to at least one of playing images, suspending playing images, ending playing of an image, channel change and volume adjustment based on the sensed movement of the shutter glasses.

9. The display apparatus according to claim 8, wherein the control signal comprises a control signal corresponding to a playing of a 3D image displayed on the display unit, suspension of playing an image, ending of playing an image, change of a chapter or a channel or adjustment of volume.

10. The display apparatus according to claim 8, further comprising a user interface (UI) generator which generates UI information, wherein
the controller controls the UI generator to generate and display on the display unit a UI corresponding to a control signal, upon receiving through the communication unit the control signal of a UI indicating that the location of the shutter glasses is not within a predetermined reference location.

11. The display apparatus according to claim 8, further comprising a speaker which outputs an audio corresponding to an audio signal, wherein
the controller controls the speaker to output an audio signal corresponding to a control signal, upon receiving a control signal corresponding to received information indicating that the location of the shutter glasses is not within the predetermined reference location.

12. The display apparatus according to claim 8, wherein the sensor of the shutter glasses senses at least one of a moving direction, angle, acceleration, angular velocity, variation and distance of the shutter glasses.

13. The display apparatus according to claim 8, wherein when the shutter glasses are turned on, the controller of the shutter glasses generates and transmits a control signal corresponding to a playing of an image displayed on the display apparatus, suspension of playing an image, ending playing of an image, change of a chapter or a channel or adjustment of volume based on the sensed movement of the shutter glasses.

14. The display apparatus according to claim 8, wherein the sensor of the shutter glasses comprises at least one of an acceleration sensor, a gyro sensor, a compass sensor, a magnetic impedance (MI) sensor, a proximity sensor and a pyroelectric passive infrared ray (PIR) sensor.

15. The display apparatus according to claim 8, wherein the sensor of the shutter glasses senses a location of the shutter glasses with respect to the display apparatus, and the controller of the shutter glasses determines whether the sensed location of the shutter glasses is within a predetermined reference location; and
when it is determined that the location of the shutter glasses is not within the predetermined reference location, the controller of the shutter glasses generates and transmits a control signal to output, from the display apparatus, information indicating that the location of the shutter glasses is not within the predetermined reference location.

16. A control method of shutter glasses being used for a display apparatus displaying a 3D image, the control method comprising:
sensing a movement of the shutter glasses; and
generating and transmitting a control signal according to the sensed movement of the shutter glasses, the control signal directing the display apparatus to perform an operation which adjusts audio data or video data output by the display apparatus corresponding to the control signal, wherein
the generating and transmitting comprises generating and transmitting the control signal corresponding to at least one of playing images, suspending playing images, ending playing of an image, channel change and volume adjustment based on the sensed movement of the shutter glasses.

17. The control method according to claim 16, further comprising:
determining whether a user is wearing the shutter glasses based on the sensed movement of the shutter glasses; and
turning on and off the shutter glasses according to the determination result.

18. The control method according to claim 16, wherein when the shutter glasses are turned on, the transmitting of the control signal comprises generating and transmitting a control signal corresponding to a playing of an image displayed on the display apparatus, suspension of playing an image, ending of playing an image, change of a chapter or a channel or adjustment of volume based on the sensed movement of the shutter glasses.

19. The control method according to claim 16, wherein the sensing the movement further comprises:
sensing a location of the shutter glasses with respect to the display apparatus; and
determining whether the sensed location of the shutter glasses is within a predetermined reference location, and when it is determined that the location of the shutter glasses is not within the predetermined reference location, the transmitting of the control signal comprises generating and transmitting a control signal to output from the display apparatus information indicating that the location is not within the predetermined reference location.

20. A control method of a display apparatus which uses shutter glasses, the control method comprising:
receiving from shutter glasses a control signal corresponding to a movement of the shutter glasses, the control signal directing the display apparatus to perform an operation which adjusts audio data or video data output by the display apparatus corresponding to the control signal; and
performing an operation corresponding to the received control signal, wherein
the receiving of the control signal comprises receiving the control signal corresponding to at least one of playing images, suspending playing images, ending playing of an image, channel change and volume adjustment based on the sensed movement of the shutter glasses.

21. The control method according to claim 20, wherein the control signal comprises a control signal corresponding to a playing of a 3D image displayed on the display unit, suspension of playing an image, ending of playing an image, change of a chapter or a channel or adjustment of volume.

22. The control method according to claim 20, wherein the receiving of the control signal further comprises receiving information indicating that the location information of the shutter glasses received through the communication unit is not within a predetermined reference location, and generating and displaying a user interface (UI) corresponding to the received information.

23. The control method according to claim 20, wherein the receiving of the control signal further comprises receiving information indicating that the location information of the shutter glasses received through the communication unit is not within a predetermined reference location, and outputting an audio signal corresponding to the received information.

* * * * *

UNITED STATES PATENT AND TRADEMARK OFFICE
CERTIFICATE OF CORRECTION

PATENT NO. : 9,294,761 B2
APPLICATION NO. : 12/915704
DATED : March 22, 2016
INVENTOR(S) : Sung-han Lee and Keun-seok Kang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this
Sixteenth Day of August, 2016

Michelle K. Lee
*Director of the United States Patent and Trademark Office*